United States Patent [19]

Miyakawa et al.

[11] Patent Number: 5,692,578
[45] Date of Patent: Dec. 2, 1997

[54] AIR INTAKE ARRANGEMENT FOR A RIDING-TYPE VEHICLE

[75] Inventors: Futoshi Miyakawa; Akihiko Kobayashi; Masahiro Kawamata, all of Saitama, Japan

[73] Assignee: Honda Giken Kogyo Kabushiki Kaisha, Tokyo, Japan

[21] Appl. No.: 479,410

[22] Filed: Jun. 7, 1995

[30] Foreign Application Priority Data

Jul. 12, 1994 [JP] Japan ............... HEI-6-160318

[51] Int. Cl.⁶ ........................................... B60K 13/02
[52] U.S. Cl. ........................... 180/68.3; 180/68.2; 280/833
[58] Field of Search ........................ 180/68.1, 68.2, 180/68.3; 24/81; 280/833, 835

[56] References Cited

U.S. PATENT DOCUMENTS

| | | | |
|---|---|---|---|
| 3,633,250 | 1/1972 | Romney | 24/81 |
| 4,689,060 | 8/1987 | Koske | 180/68.1 |
| 4,744,432 | 5/1988 | Shibata et al. | 180/68.1 |
| 5,478,098 | 12/1995 | Akagi et al. | 180/68.3 |

FOREIGN PATENT DOCUMENTS

| | | | |
|---|---|---|---|
| 62-214222 | 3/1986 | Japan | 180/68.1 |
| 62-105719 | 5/1987 | Japan | 180/68.3 |
| 62-214222 | 9/1987 | Japan . | |
| 64-27464 | 2/1989 | Japan . | |
| 2-28078 | 6/1989 | Japan | 180/68.2 |

*Primary Examiner*—Brian L. Johnson
*Assistant Examiner*—Jonathan E. Butts
*Attorney, Agent, or Firm*—Birch, Stewart, Kolasch & Birch, LLP

[57] ABSTRACT

An air intake tube is provided for attempting to prevent, as much as possible, the entry of mud or water splashed by the front wheels of a vehicle having a structure with an engine, an air cleaner arranged adjacent to and at the back of the engine and a fuel tank positioned above the engine. The engine and other elements are mounted at an intermediate portion of a body frame having its front portion suspending the front wheels and its rear portion suspending the rear wheels. An air intake tube extends from the air cleaner toward the fuel tank. In the rear wall of the fuel tank, there is formed inwardly an accommodation recess extending backward, and the air intake tube has its open top end projecting into the accommodation recess.

16 Claims, 7 Drawing Sheets

AIR INTAKE ARRANGEMENT FOR A RIDING-TYPE VEHICLE

BACKGROUND OF THE INVENTION

1. Field of the Invention

The present invention relates to a riding-type vehicle in which an engine, an air cleaner arranged adjacent to, and at the back of, the engine and a fuel tank positioned above the engine are mounted in the intermediate portion of a body frame. A front portion of the body frame is suspended by front wheels and a rear portion is suspended by rear wheels. An air intake tube extends from the air cleaner towards the fuel tank.

2. Description of Background Art

Conventionally, a riding-type vehicle is known as shown in Japanese Utility Model Laid-open No. 27464/1989 and Japanese Patent Laid-open No. 214222/1987.

In the case of the vehicle disclosed in the aforementioned Japanese Utility Model Laid-open No. 27464/1989, the air intake tube is connected to the inside of the frame extending in the central portion of the fuel tank and has its open top end terminating in a position corresponding to the front portion of the fuel tank. However, such structure necessitates not only the reduction of the volume of the fuel tank but also the elongation of the air intake tube which results in complicating the structure of the body frame.

Therefore, in Japanese Patent Laid-open No. 214222/1987, an inwardly depressed recess is formed in the bottom portion of the fuel tank and the open top end of the air intake tube extending forwardly and obliquely upward from the air cleaner projects into the recess. However, this structure has a disadvantage in view of the possibility that mud and water splashed by the front wheels lying ahead of the fuel tank enters toward the bottom plate of the fuel tank and the open top end of the air intake tube. In order to prevent this, it is necessary to provide a complicated mechanism.

SUMMARY AND OBJECTS OF THE INVENTION

The present invention has been made in view of the above-mentioned circumstances and has for its object to provide a riding-type vehicle which is provided with an air intake tube so arranged so as to prevent the entry thereinto of mud or water splashed by the front wheels.

In order to achieve the above-specified object, the invention includes a riding-type vehicle, in which an engine, an air cleaner arranged adjacent to, and at the back of, the engine and a fuel tank positioned above the engine are mounted at an intermediate portion of a body frame having its front portion suspending front wheels and its rear portion suspending rear wheels. An air intake tube is provided and extends from the air cleaner toward the fuel tank. The fuel tank is provided in its rear wall with an accommodation recess formed inward to extend backward and the air intake tube has its open top end projecting into the accommodation recess.

A shielding plate is arranged between the fuel tank and the engine to cover the lower portion of the accommodation recess and is fixed on said body frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

One embodiment of the present invention will be described with reference to the accompanying drawings.

Figure 1:
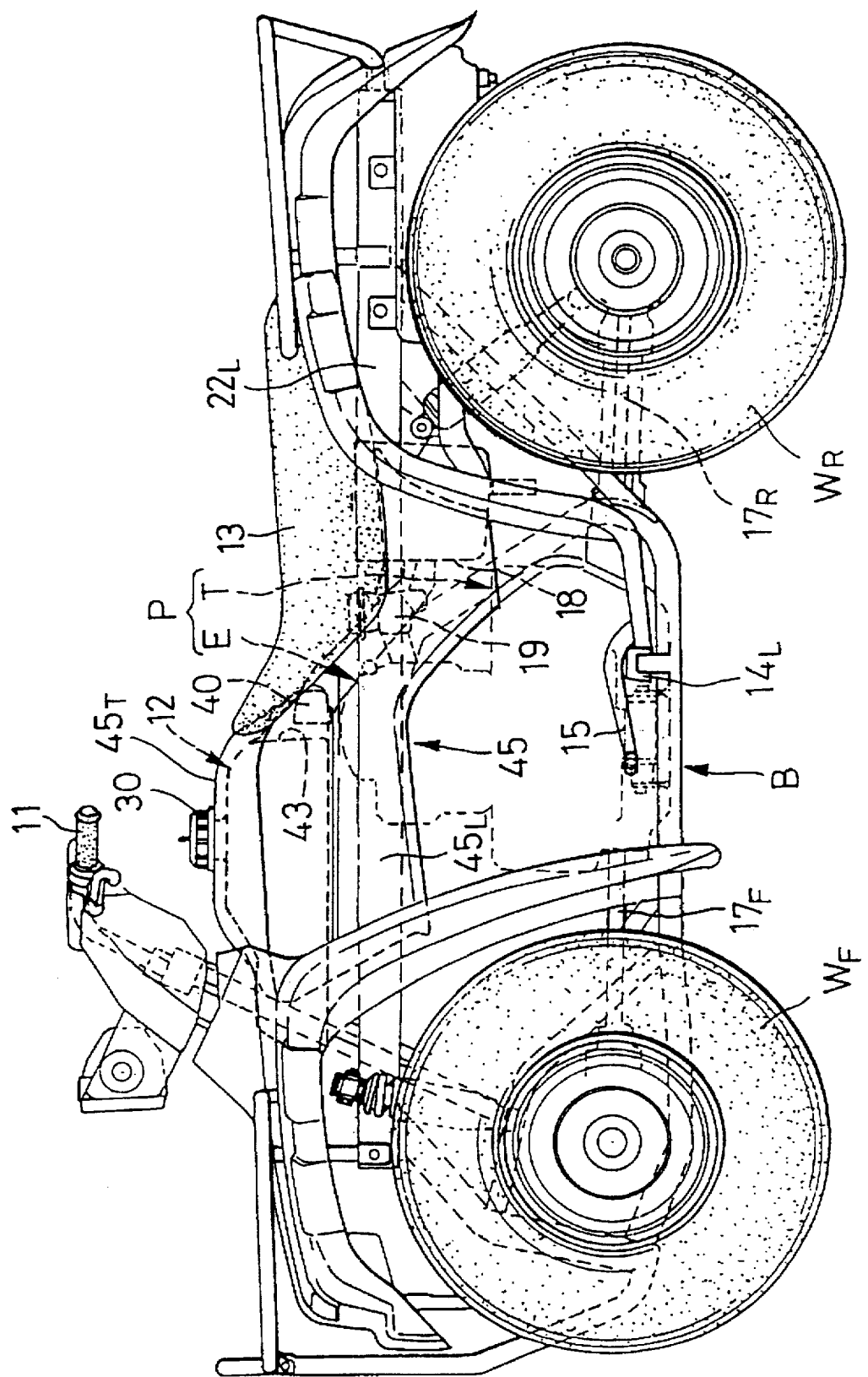
FIG. 1 is a side elevation showing a riding-type vehicle.

FIGS. 1 to 7 show one embodiment of the present invention. Referring first to FIG. 1, the riding-type vehicle is exemplified by an all terrain vehicle having a body frame B suspending a pair of lefthand and righthand front wheels $W_F$ at a front portion and a pair of lefthand and righthand rear wheels $W_R$ at a rear portion. The wheels $W_F$ and $W_R$ are respectively equipped with balloon type low-pressure tires. The body frame B, includes a steering handle 11, a fuel tank 12 and a riding-type driver's seat 13 arranged relative thereto.

Figure 2:
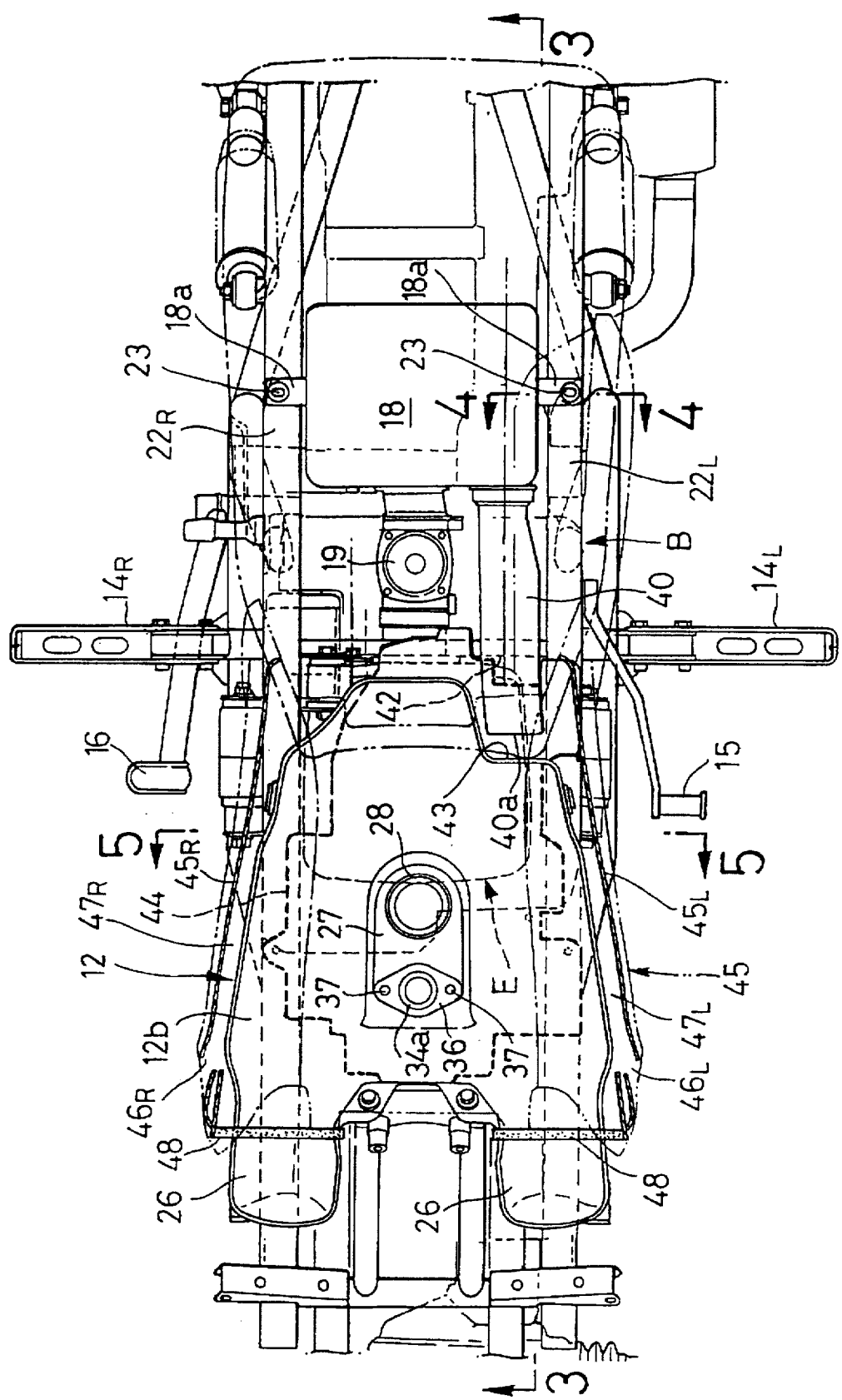
FIG. 2 is an enlarged top plan view showing an essential portion of the vehicle of FIG. 1 with a fuel tank cover being removed.
Figure 3:
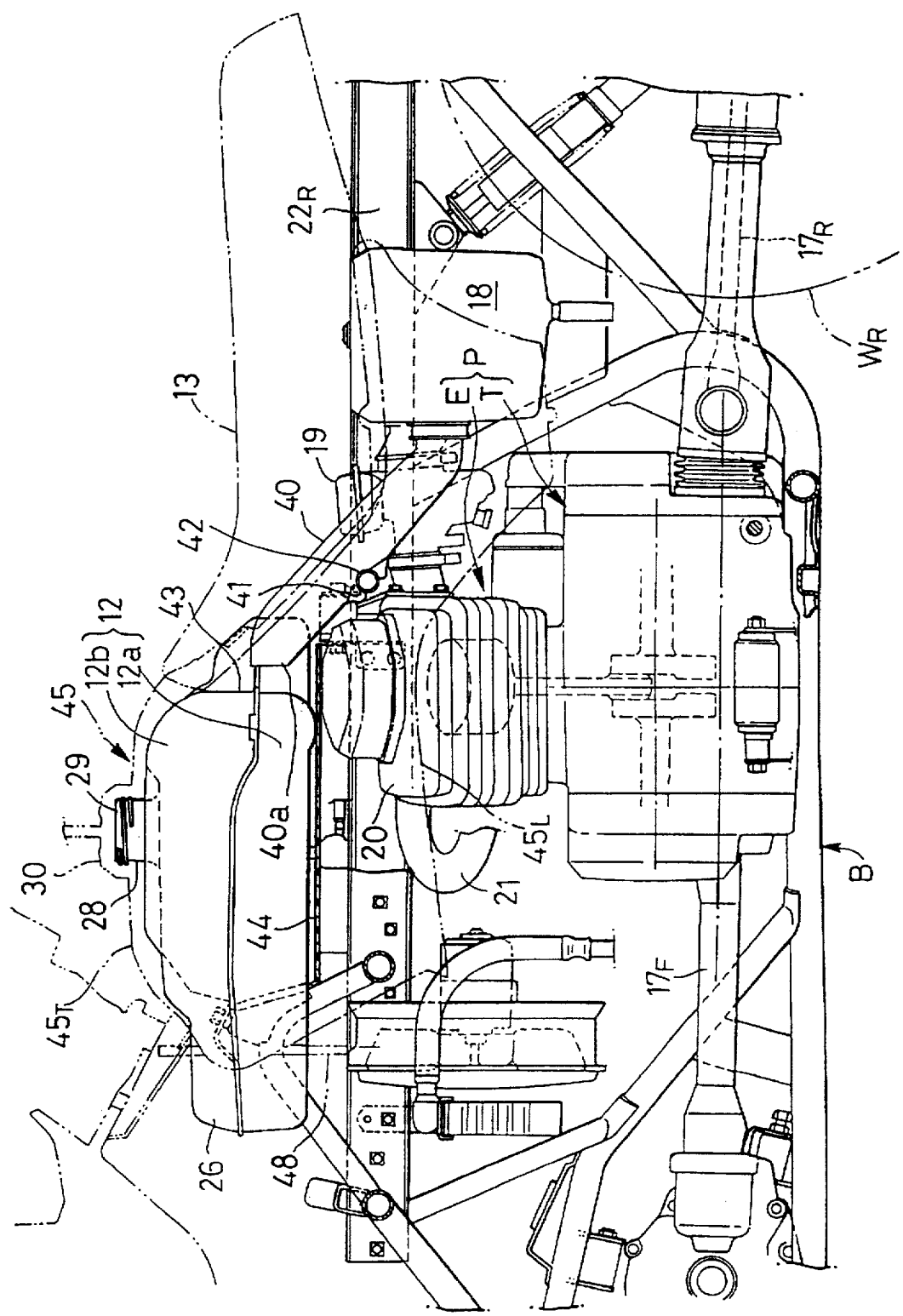
FIG. 3 is a section taken along line 3—3 of FIG. 2.

Referring to FIGS. 2 and 3, a pair of right and left steps $14_L$ and $14_R$ are fixed at the center of the lower portion of the body frame B so as to project toward both sides to support the feet of an operator seated on the operator's seat 13. A change pedal 15 is arranged near the left step $14_L$, and a pedal 16 is arranged near the right step $14_R$.

A power unit P comprising an engine E and a transmission T having a common casing are mounted at the intermediate portion of the body frame B and below the fuel tank 12 and the driver's seat 13. The driving force of the power unit P is transmitted to the left and right front wheels $W_F$ by a drive shaft $17_F$ extending forward from the power unit P and also to the left and right rear wheels $W_R$ by a drive shaft $17_R$ extending backward from the power unit P.

An air cleaner 18 which is connected through a carburetor 19 to the back face of a cylinder head 20 of the engine E is mounted to the back of the engine E on the body frame B. An exhaust pipe 21, as connected to the front face of the cylinder head 20, extends backward around the lefthand side of the engine E.

Figure 4:
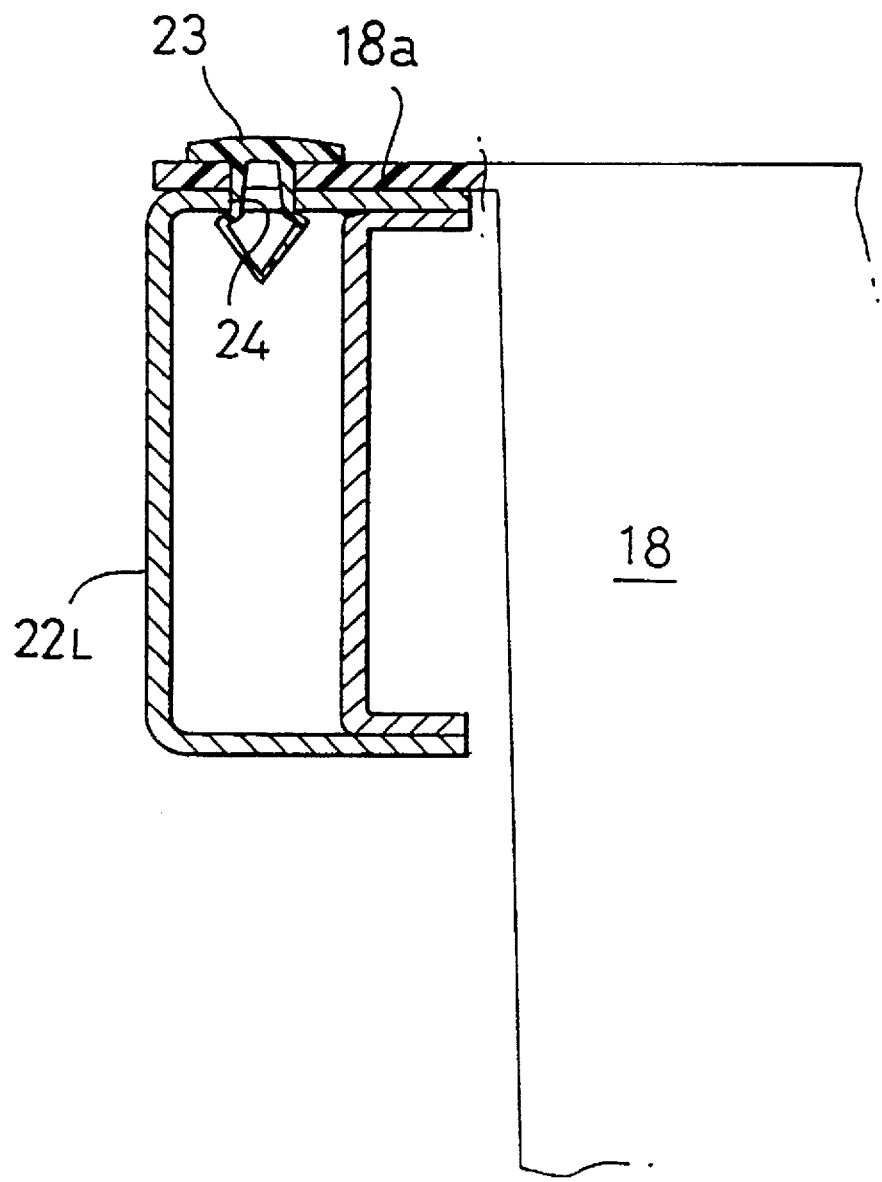
FIG. 4 is an enlarged section taken along line 4—4 of FIG. 2.

The body frame B is equipped with a pair of support frames $22_L$ and $22_R$ which longitudinally extend on both sides of the engine E, respectively. The air cleaner 18, as arranged at the back of the engine E, is provided integrally at both sides of the upper portion thereof with flanges 18a, 18a which are placed on the two support frames $22_L$ and $22_R$. Thus, the air cleaner 18 is supported in a fixed arrangement on the two support frames $22_L$ and $22_R$, as shown in FIG. 4, such that clips 23 and 23 which are respectively inserted into the flanges 18a and 18a are elastically engaged with engagement holes 24, formed in the support frames $22_L$ and $22_R$, respectively.

Figure 5:
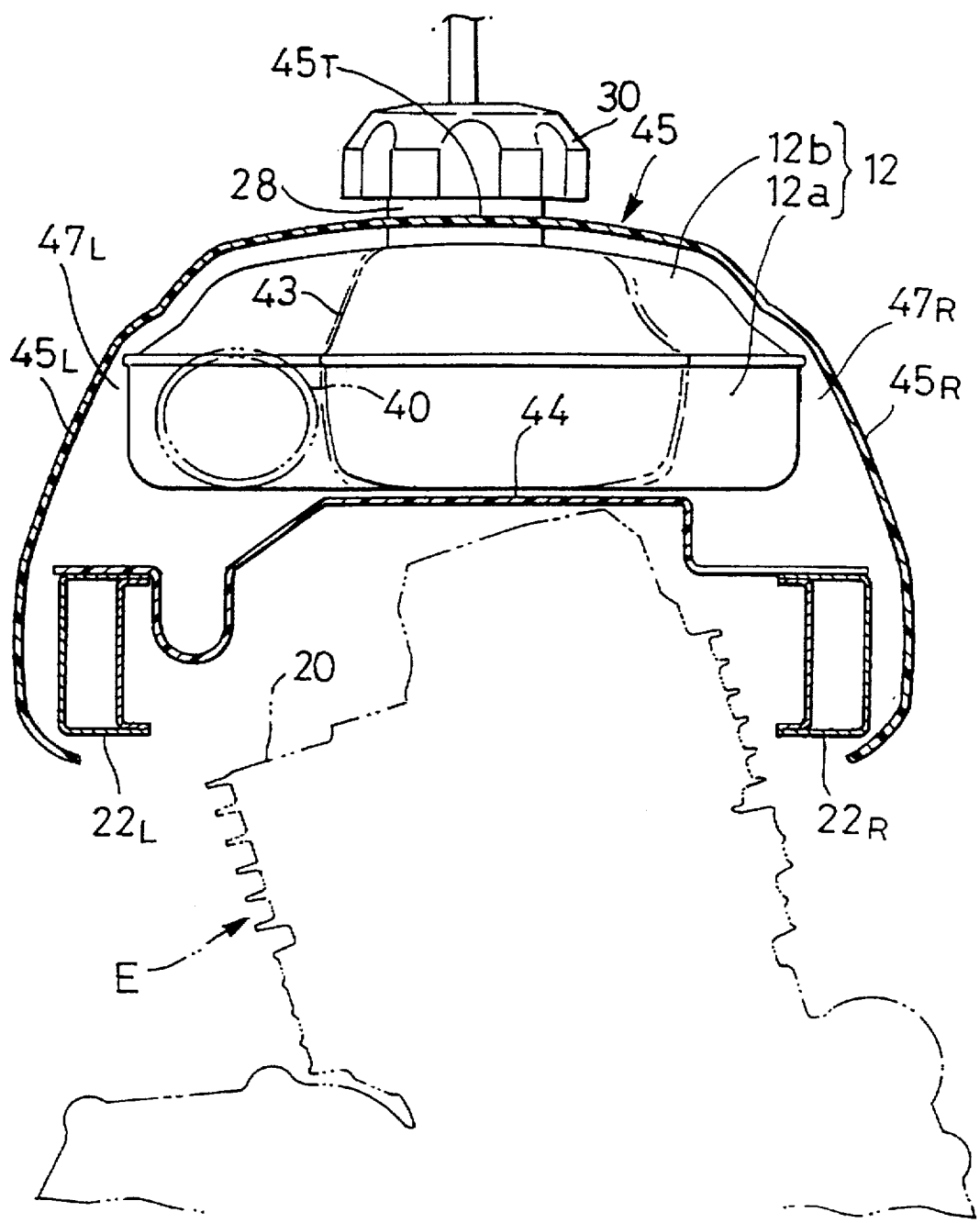
FIG. 5 is a section taken along line 5—5 of FIG. 2.
Figure 6:
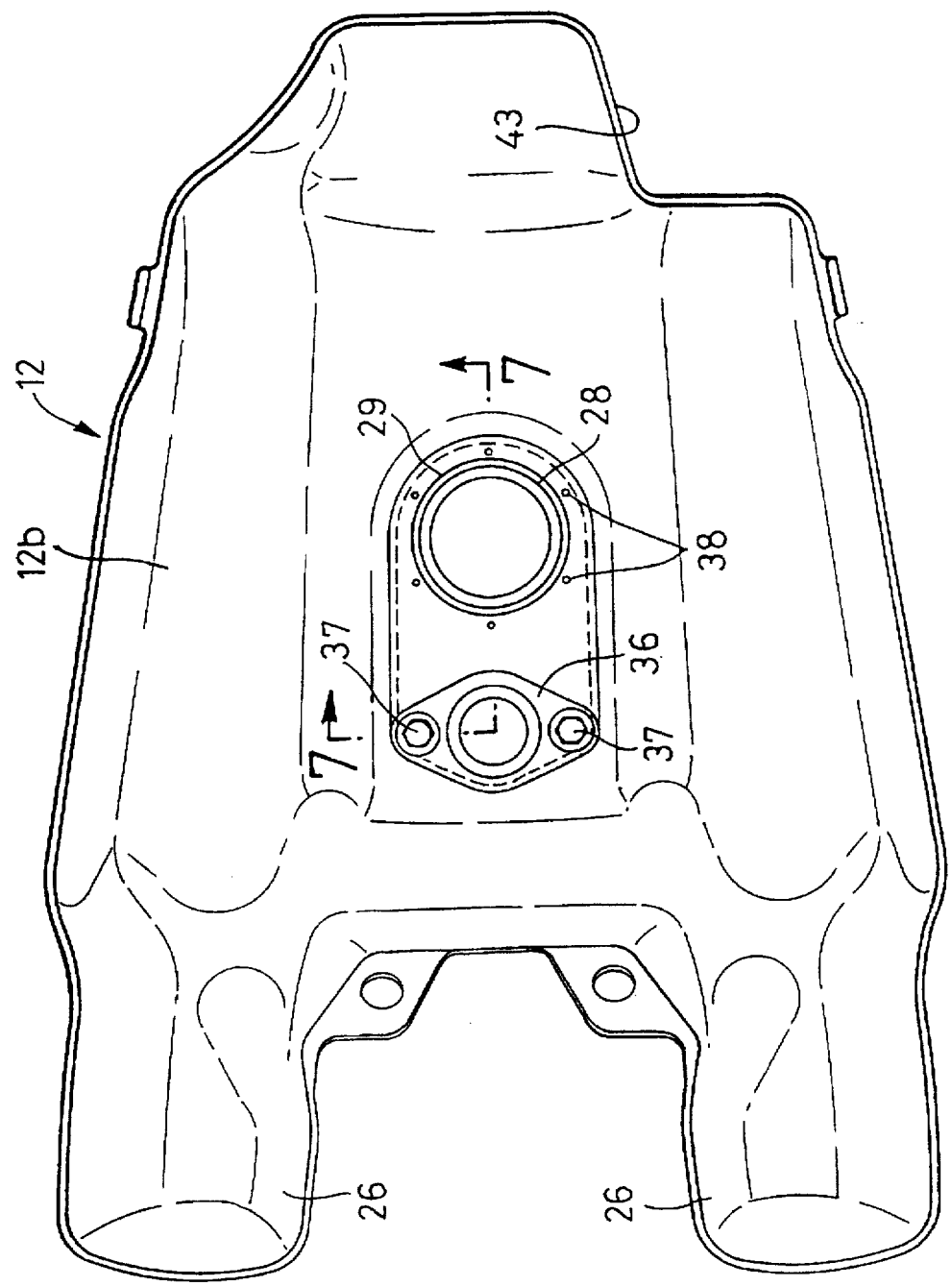
FIG. 6 is a top plan view of a fuel tank.
Figure 7:
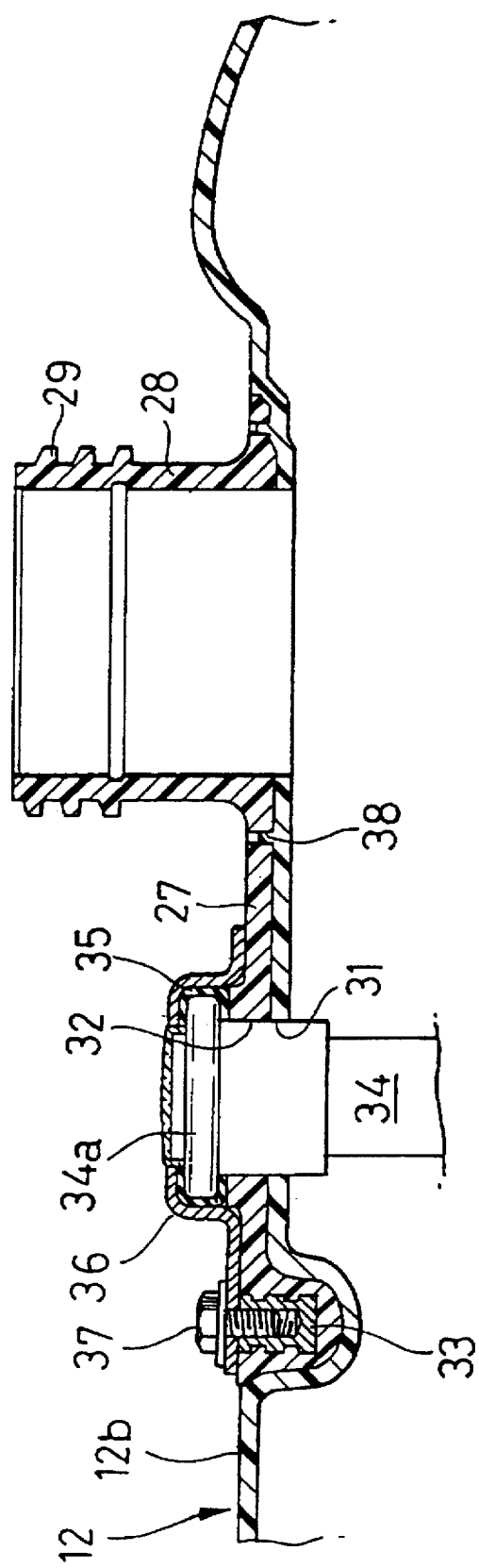
FIG. 7 is an enlarged section taken along line 7—7 of FIG. 6.

Referring to FIGS. 5 and 6, the fuel tank 12 comprises a combination of a lower half 12a and an upper half 12b made of a synthetic resin material and is fixed to the body frame B above the engine E, i.e., at a position obliquely upward in front of the air cleaner 18. Further, projections 26 and 26 projecting forward from the fuel tank 12 are provided at both sides of the front portion thereof.

A mounting member 27 is integrally connected to the upper surface of the central portion of the upper half 12b of the fuel tank 12 when the fuel tank 12 is blow-molded. The mounting member 27 is formed by injection-molding with a synthetic resin material. A fuel supply tube 28 extends upward into the fuel tank 12 and is provided integrally with the mounting member 27. The fuel supply tube 28 has its outer circumference externally threaded, as at 29. Thus, the mounting member 27 is injection-molded independently of the fuel tank 12 so that the accuracy of the external thread-dimension 29 can be improved. The fuel supply tube 28 is closed by turning a fuel cap 30, as shown in FIG. 5, in the external thread-dimension 29.

The mounting member 27 is provided with a mounting hole 32 leading to a hole 31 which is formed in the upper half 12b. Nuts 33 are integrally embedded in the mounting member 27 at two portions across the mounting hole 32. Into the mounting hole 32 and the hole 31, there is inserted a fuel level meter 34 which has its indicator 34a engaging through a seal member 35 with the peripheral edge of the upper end of the mounting hole 32. Further, a cover 36 engaging the indicator 34a through the aforementioned seal member 35 abuts against the mounting member 27, and a pair of screw members 37 and 37 which are fitted into the cover 36 are fitted into the aforementioned individual nuts 33 so that the fuel level meter 34 is firmly fastened to the fuel tank 12.

Incidentally, the mounting member 27 has a plurality of gas vents 38 formed in advance at the portion surrounding the fuel supply tube 28 so that when the mounting member 27 is integrally connected with the upper half 12b of the fuel tank 12 by blow-molding, the synthetic resin material enters the gas vents 38 thereby allowing the mounting member 27 to be firmly connected to the upper half 12b of the fuel tank.

The fuel tank 12 is positioned obliquely upward in front of the air cleaner 18 but a synthetic resin air intake tube 40 communicating with the air cleaner 18 is extends upward and forward therefrom into the air cleaner 18 toward the fuel tank 12 so that it can introduce the outside air into the air cleaner even in relatively deep water. Further, the air cleaner 18 is provided at its intermediate lower portion with a semicircular elastic fitting portion 41 so that the air intake tube 40 is supported by fitting the elastic fitting portion 41 into a support cylinder 42 which is mounted in the body frame B.

The fuel tank 12 is provided at the lefthand corner of its rear wall with an accommodation recess 43 which is formed inward to extend backward. The air intake tube 40 has its open top end 40a arranged in the accommodation recess 43 and is opened forward.

A shielding plate 44 made of a heat-resistant rigid resin is arranged between the engine E in the power unit P and the fuel tank 12 positioned above the engine E. The lower portion of the accommodation recess 43 is covered thereby. The shielding plate 44 is fixed on the two support frames $22_L$ and $22_R$ of the body frame B.

To the body frame B, there is attached a fuel tank cover 45 for covering the fuel tank 12. This fuel cover 45 comprises a lefthand cover portion $45_L$ for covering the left side surface of the fuel tank 12, the upper portion of the engine E and the left side of the air cleaner 18, a righthand cover portion $45_R$ for covering the right side surface of the fuel tank 12, and an upper cover $45_T$ for covering the upper surface of the fuel tank 12. The fuel supply tube 28 of the fuel tank 12 is made to project upward through the upper cover portion $45_T$.

Outside air passages $47_L$ and $47_R$ are individually formed between the left and right cover portions $45_L$ and $45_R$ of the fuel tank cover 45 and the both left and right sides of the fuel tank 12, and outside air intake ports $46_L$ and $46_R$, respectively, communicating with the individual outside air passages $47_L$ and $47_R$ are formed at the front portions of the left and right cover portions $45_L$ and $45_R$. Thus, during operation of the vehicle, the outside air, as introduced from the left outside air inlet port $46_L$, is introduced via the outside air passage $47_L$ into the open top end 40a of the air intake tube 40, and the outside air, as introduced from the right outside air inlet port $46_R$, is guided via the outside air passage $47_R$ to cool the carburetor 19, the air cleaner 18 and so on.

Rubber plates 48 and 48 are attached to the front end portions of the left and right cover portions $45_L$ and $45_R$. The front projections 26 and 26 of the fuel tank 12 extend forward through the rubber plates 48 and 48. Thus, the two rubber plates 48 and 48 close the gaps formed between the front portion of the fuel tank cover 45 and the fuel tank 12 thereby preventing mud or water, splashed up by the two front wheels $W_F$, from flying from the aforementioned gaps to the back of the fuel tank 12.

Next, to describe the operation of this embodiment, the air intake tube 40 leading to the air cleaner 18 located at the back of the engine E extends toward the fuel tank 12 above the engine E and has its open top end 40a arranged in the accommodation recess 43 which is formed at the rear wall of the fuel tank 12 and extends backward. As a result, the fuel tank 12 is interposed between the open top end 40a of the air intake tube 40 and the two front wheels $W_F$, so that even if mud water is splashed by the two front wheels $W_F$ toward the bottom plate of the fuel tank 12, the entry thereof into the open top end 40a of the air intake tube 40 is prevented as much as possible. Moreover, as compared with the prior art vehicle (as disclosed in Japanese Patent Laid-Open No. 214222/1987) in which the fuel tank 12 has, at its bottom plate, a recess for receiving the open top end 40a of the air intake tube 40, the shape of the bottom plate of the fuel tank 12 can be simplified. Especially because the accommodation recess 43 is formed in the lefthand corner of the rear wall of the fuel tank 12, the shape of the fuel tank 12 can be simplified.

Moreover, the shield plate 44 is interposed between the fuel tank 12 and the engine E to cover the lower portion of the accommodation recess 43. It can more reliably prevent mud or water splashed by the front wheels $W_F$, from reaching the fuel tank 12 and accordingly, the entry of mud or water into the open top end 40a of the air intake tube 40 can be securely prevented. Moreover, the effect of the radiation of heat from the engine upon the outside air to be introduced into the air intake tube can be eliminated and the temperature of the outside air introduced into the engine E can be prevented from increasing so that the fluctuation of the output of the engine E can be controlled.

Although the present invention has been described in detail hereinbefore in connection with its embodiment, it should not be limited thereto, but a variety of design changes can be made without departing from the scope of the invention as defined in the scope of the claim.

For example, the accommodation recess 43 should not be limited in its location to the lefthand corner of the rear wall of the fuel tank 12 but may be formed in any position in the rear wall of the fuel tank 12.

As described hereinbefore, according to the invention, the fuel tank is provided in its rear wall with the accommodation recess formed inwardly to extend backward, and the air intake tube has its open top end projecting into the accommodation recess. Consequently, it is possible to prevent the entry of the mud or water splashed by the front wheels while at the same time, simplifying the shape of the fuel tank.

Further, the shield plate is arranged between the fuel tank and the engine to cover the lower portion of the accommodation recess and is fixed on the body frame. As a result, not only the mud or water, as splashed by the front wheels, can be prevented from entering into the open top end of the air intake tube, but also the temperature of the outside air being introduced into the air intake tube can be prevented from increasing by the radiation of heat from the engine, thereby controlling the output fluctuation of the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air intake assembly for a vehicle having an engine, an air cleaner arranged adjacent to said engine and a fuel tank positioned above the engine comprising:

an air intake tube extending from said air cleaner toward the fuel tank; and an accommodation recess formed in the fuel tank in a rear wall thereof, said recess being depressed inward and then extending backward and the air intake tube including an open top end arranged in the accommodation recess;

said fuel tank includes projections extending forwardly therefrom and plate members are adapted to mate with said projections of said fuel tank for sealing said projections from ambient conditions during operation of said vehicle.

2. The air intake assembly for a vehicle as set forth in claim 1, wherein a shielding plate is arranged between the fuel tank and the engine for covering a lower portion of the accommodation recess, said shielding plate being fixed on a body frame.

3. The air intake assembly for a vehicle as set forth in claim 1, and further including an elastic fitting portion secured to said air intake tube for mounting said air intake tube relative to a body frame.

4. The air intake assembly for a vehicle as set forth in claim 3, wherein said elastic fitting portion is semicircular in shape.

5. The air intake assembly for a vehicle as set forth in claim 1, wherein said recess is formed in a corner of a rear portion of said fuel tank.

6. The air intake assembly for a vehicle as set forth in claim 1, and further a fuel cover provided over said fuel tank and forming outside air passages being in communication with said air intake tube.

7. The air intake assembly for a vehicle as set forth in claim 6, wherein said fuel cover forms outside air passages on left and right sides of said fuel tank.

8. The air intake assembly for a vehicle as set forth in claim 1, wherein said air intake tube is constructed of a synthetic resin material.

9. An air intake assembly for a vehicle having an engine, an air cleaner arranged adjacent to said engine and a fuel tank mounted relative to the engine comprising:

an air intake tube extending from said air cleaner toward the fuel tank; and an accommodation recess formed in said fuel tank, said recess being depressed inward and said air intake tube including an open top end arranged in the accommodation recess;

said fuel tank includes projections extending forwardly therefrom and plate members are adapted to mate with said projections of said fuel tank for sealing said projections from ambient conditions during operation of said vehicle.

10. The air intake assembly for a vehicle as set forth in claim 9, wherein a shielding plate is arranged between the fuel tank and the engine for covering a lower portion of the accommodation recess, said shielding plate being fixed on a body frame.

11. The air intake assembly for a vehicle as set forth in claim 1, and further including an elastic fitting portion secured to said air intake tube for mounting said air intake tube relative to a body frame.

12. The air intake assembly for a vehicle as set forth in claim 11, wherein said elastic fitting portion is semicircular in shape.

13. The air intake assembly for a vehicle as set forth in claim 9, wherein said recess is formed in a corner of a rear portion of said fuel tank.

14. The air intake assembly for a vehicle as set forth in claim 9, and further including a fuel cover provided over said fuel tank and forming outside air passages being in communication with said air intake tube.

15. The air intake assembly for a vehicle as set forth in claim 14, wherein said fuel cover forms outside air passages on left and right sides of said fuel tank.

16. The air intake assembly for a vehicle as set forth in claim 9, wherein said air intake tube is constructed of a synthetic resin material.

* * * * *